US007277871B2

(12) United States Patent
Suzuki et al.

(10) Patent No.: US 7,277,871 B2
(45) Date of Patent: Oct. 2, 2007

(54) DIGITAL WATERMARK SYSTEM

(75) Inventors: Yoiti Suzuki, Sendai (JP); Ryouichi Nishimura, Sendai (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 560 days.

(21) Appl. No.: 10/290,396

(22) Filed: Nov. 8, 2002

(65) Prior Publication Data

US 2003/0172277 A1 Sep. 11, 2003

(30) Foreign Application Priority Data

Mar. 11, 2002 (JP) ............................ 2002-065606

(51) Int. Cl.
*G06F 1/24* (2006.01)

(52) U.S. Cl. ................ 705/57; 705/1; 920/1; 380/252; 380/264; 380/277

(58) Field of Classification Search .................. 705/50, 705/1, 57; 920/1; 380/252, 264, 277
See application file for complete search history.

(56) References Cited

U.S. PATENT DOCUMENTS

| | | | | |
|---|---|---|---|---|
| 5,893,067 | A | 4/1999 | Bender et al. | |
| 5,930,369 | A * | 7/1999 | Cox et al. | 380/54 |
| 6,006,328 | A * | 12/1999 | Drake | 726/23 |
| 6,157,330 | A * | 12/2000 | Bruekers et al. | 341/143 |
| 6,205,249 | B1 * | 3/2001 | Moskowitz | 382/232 |
| 6,320,965 | B1 * | 11/2001 | Levine | 380/34 |
| 6,330,672 | B1 * | 12/2001 | Shur | 713/176 |
| 6,385,329 | B1 * | 5/2002 | Sharma et al. | 382/100 |
| 6,424,725 | B1 * | 7/2002 | Rhoads et al. | 382/100 |
| 6,674,861 | B1 * | 1/2004 | Xu et al. | 380/252 |
| 2002/0078359 | A1 * | 6/2002 | Seok et al. | 713/176 |
| 2003/0172277 | A1 * | 9/2003 | Suzuki et al. | 713/176 |

FOREIGN PATENT DOCUMENTS

| | | |
|---|---|---|
| GB | 2 363 300 | 12/2001 |
| JP | 1041767 | * 10/2000 |

OTHER PUBLICATIONS

Robust Audio Watermarking in the Time Domain, Parakevi Bassia, 2001.*

B.-S. Ko, et al., Proc. IEEE International Conference Acoustics Speech & Signal Processing, vol. 2, pp. II-2001-II-2004, "Time-Spread Echo Method for Digital Audio Watermarking Using PN Sequences", May 13-17, 2002.

S. W. Foo, et al., Proc. IEEE Region 10 International Conference Electrical & Electronic Technology, vol. 2, pp. 509-513, "An Adaptive Audio Watermarking System", Aug. 19-22, 2001.

H. O. Oh, et al., Proc. IEEE International Conference Acoustics Speech & Signal Processing, vol. 3, 1 page, "New Echo Embedding Technique for Robust and Imperceptible Audio Watermarking", May 7-11, 2001 (Abstract only).

Hyen O Oh, et al., "New Echo Embedding Technique for Robust and Imperceptible Audio Watermarking", Proceedings of ICASSP'2001, vol. 3, May 7, 2001, 4 pages.

Laurence Boney, et al., "Digital Watermarks for Audio Signals", Proceedings of MULTIMEDIA'96, Jun. 17, 1996, pp. 473-480.

* cited by examiner

*Primary Examiner*—Andrew J. Fischer
*Assistant Examiner*—John Winter
(74) *Attorney, Agent, or Firm*—Oblon, Spivak, McClelland, Maier & Neustadt, P.C.

(57) ABSTRACT

A digital watermark embedding apparatus generates an echo signal, which is delayed a time period corresponding to digital watermark information to be embedded with respect to each tone signal that forms an original audio signal, and inserts the generated echo signal in the original audio signal by spreading the echo signal on the time axis, thus outputting a watermarked audio signal. A digital watermark detection apparatus despreads echo signals contained in the watermarked audio signal on the time axis, and extracts digital watermark information from the generation time of the despread echo signal contained in the watermarked audio signal.

8 Claims, 4 Drawing Sheets

DIGITAL WATERMARK SYSTEM

CROSS-REFERENCE TO RELATED APPLICATIONS

This application is based upon and claims the benefit of priority from the prior Japanese Patent Application No. 2002-65606, filed Mar. 11, 2002, the entire contents of which are incorporated herein by reference.

BACKGROUND OF THE INVENTION

1. Field of the Invention

The present invention relates to a digital watermark system, which comprises a digital watermark embedding apparatus for embedding digital watermark information in an original audio signal, and a digital watermark detection apparatus for detecting the digital watermark embedded in the original audio signal.

2. Description of the Related Art

In recent years, end users can easily perform digital recording of digital audio information (audio contents), which are provided via communication media such as digital TV broadcast, the Internet, and the like in addition to commercially available CDs (Compact Disks), DVDs (Digital Versatile Disks), and the like, and can form copies using the digitally recorded contents. Upon digital recording, since copies can be formed without any quality deterioration, problems about infringement of copyrights are serious.

As a scheme for monitoring such pirate copies, a scheme in which a provider of audio contents embeds digital watermark information which has no effect on audio quality and represents, e.g., a production number or the like in the audio contents, has been proposed.

Various schemes have been proposed as a technique for embedding digital watermark information in a digital audio signal. As typical schemes, (a) a single echo scheme and (b) PN (pseudo random noise) sequence scheme are available. The basic operations of these schemes will be explained below.

(a) Single Echo Scheme

In this single echo scheme, as shown in FIGS. 1 and 2, an echo signal 2 is inserted in an original audio signal a at a time delayed a time period (delay time period) $\Delta_1$ or $\Delta_2$ corresponding to [1] or [0] of digital watermark information b with respect to each tone signal 1 which forms this original audio signal a. Note that the actual time periods $\Delta_1$ and $\Delta_2$ are as short as several ms (milliseconds).

More specifically, as shown in a digital watermark embedding apparatus in FIG. 2, a time masking unit 3 detects the output time $t_0$ of each tone signal 1 of the input original audio signal a. The detected output time $t_0$ is supplied to an impulse response signal generator 4. The impulse response signal generator 4 outputs an impulse response signal c as the echo signal 2 to a convolution unit 5 at a time which is delayed the time period $\Delta_1$ or $\Delta_2$ corresponding to [1] or [0] of digital watermark information b with respect to that output time $t_0$.

The convolution unit 5 executes a convolution process of the input original audio signal a and impulse response signal c, and outputs the convolution process result as a watermarked audio signal d shown in FIG. 1.

Although a digital watermark detection apparatus for detecting the digital watermark information b from the watermarked audio signal d generated by this digital watermark embedding apparatus is not shown, if this digital watermark detection apparatus calculates autocorrelation of this watermarked audio signal d, a peak appears at the time $\Delta_1$ or $\Delta_2$ corresponding to [1] or [0] of digital watermark information b, and the digital watermark information b embedded in the watermarked audio signal d can be detected.

When the original audio signal a is a signal which continues for a given period of time, such as music or the like, if an impulse response signal c, which approximates the entire original audio signal a to a state delayed by the time period $\Delta_1$ or $\Delta_2$ corresponding to [1] or [0] of digital watermark information b, is continuously output, the time masking unit 3 is not always required.

(b) PN (Pseudo Random Noise) Sequence Scheme

In this PN sequence scheme, as shown in FIG. 5, a PN sequence signal e [$PN_1$ or $PN_0$] corresponding to [1] or [0] of digital watermark information b is inserted in each tone signal 1 which forms an original audio signal a on the frequency axis.

More specifically, as shown in a digital watermark embedding apparatus in FIG. 3, a Fourier transformer 6 Fourier-transforms the input original audio signal a into a signal in the frequency axis domain, and supplies the transformed signal to a frequency masking unit 7 and adder 10. A PN sequence generator 9 outputs a PN sequence signal e [$PN_1$ or $PN_0$] corresponding to [1] or [0] of digital watermark information b to a multiplier 8. More specifically, $2^m-1$ (m; a positive integer) bit values which form a PN sequence [$PN_1$ or $PN_0$] are respectively added to sample values at all frequencies or at frequencies $\omega_1, \omega_2, \omega_3, \ldots, \omega_M$ over a broad range.

The frequency masking unit 7 outputs frequency weighting characteristics for weighting respective frequency components of the PN sequence signal e [$PN_1$ or $PN_0$] to the multiplier 8 on the basis of frequency masking characteristics obtained from, e.g., the frequency distribution of an input signal in consideration of human auditory masking characteristics.

The multiplier 8 weights the PN sequence signal e [$PN_1$ or $PN_0$] using the frequency weighting characteristics, and outputs the weighted signal to the adder 10.

The adder 10 adds the frequency-weighted PN sequence signal e [$PN_1$ or $PN_0$] output from the multiplier 8 to the Fourier-transformed original audio signal a. The Fourier-transformed original audio signal a added with the PN sequence signal e [$PN_1$ or $PN_0$] is inversely Fourier-transformed into a time axis domain by an inverse Fourier transformer 11, and is output as a watermarked audio signal $d_1$ shown in FIG. 5.

In a digital watermark detection apparatus, as shown in FIG. 4, the input watermarked audio signal $d_1$ is Fourier-transformed into a signal in the frequency axis domain by a Fourier transformer 12, and the Fourier-transformed signal is input to a correlation calculation unit 13. The correlation calculation unit 13 makes a correlation operation between the Fourier-transformed watermarked audio signal $d_1$ and a PN sequence signal e [$PN_1$ or $PN_0$], which is output from a PN sequence generator 14, and is the same as the PN sequence signal e used in embedding. The correlation calculation unit 13 outputs the correlation operation result as a correlation signal to a binarization unit 15. The binarization unit 15 binarizes the correlation signal to “1” or “0”, and outputs a binary value as digital watermark information b.

However, even in the aforementioned digital watermarking methods, the following problems remain unsolved.

That is, in (a) the single echo scheme, the digital watermark information b to be embedded in the original audio signal a is indicated by the time periods $\Delta_1$ and $\Delta_2$ between each tone signal 1 and echo signals 2 (impulse response signals c) inserted at temporal neighbors of the tone signal 1, as shown in FIG. 1. Therefore, it is easy for a third party to decode the digital watermark information b from the watermarked audio signal d using, e.g., an autocorrelation calculation method.

That is, since secrecy of information indicating whether or not digital watermark information b is embedded, and the embedded watermark information b cannot be assured, a malevolent third party may use such information.

Furthermore, in order to improve the detection performance of digital watermark information b, since echo signals 2 (impulse response signals c) with a relatively large level must be inserted, signal quality such as the S/N ratio of the watermarked audio signal d may impair.

In (b) the PN (pseudo random noise) sequence scheme, since digital watermark information b of [1] or [0] is embedded as the PN sequence signal e [$PN_1$ or $PN_0$] in the Fourier-transformed original audio signal a, secrecy of the embedded digital watermark information b can be assured. Also, since the PN sequence signal e [$PN_1$ or $PN_0$] is distributed over a broad range, its signal level can be lowered.

In this case, the PN sequence signal e [$PN_1$ or $PN_0$] is consequently distributed over the entire frequency range. However, an audio signal of music or speech is not distributed over the entire human audible frequency range and whole time band.

Therefore, in a frequency or time range in which the original audio signal a has a low level, the embedded digital watermark information b may be heard as a slight noise in the watermarked audio signal $d_1$. Hence, the fact that the digital watermark information b is embedded is perceivable to a listener.

BRIEF SUMMARY OF THE INVENTION

It is an object of the present invention to provide a digital watermark system, which can sufficiently assure secrecy of digital watermark information embedded in an original audio signal, can suppress the frequency domain range of the digital watermark information embedded in the original audio signal, and can distribute the digital watermark information over a broad range of the original audio signal, so that no third party can consequently easily discriminate the fact that the digital watermark information is embedded, thus improving security for copy protection of the original audio signal.

The first aspect of the present invention is applied to a digital watermark embedding apparatus for embedding digital watermark information in an input original audio signal, and outputting a watermarked audio signal.

In order to achieve the above object, a digital watermark embedding apparatus according to the first aspect of the present invention comprises echo signal generation means for generating an echo signal, which is delayed a time period corresponding to digital watermark information to be embedded with respect to each tone signal that forms the input original audio signal, and echo signal spread means for inserting the generated echo signal by spreading the echo signal on a time axis, and outputting a watermarked audio signal.

The second aspect of the present invention is applied to a digital watermark detection apparatus for detecting, from an input watermarked audio signal, which contains echo signals spread on the time axis, digital watermark information embedded in that watermarked audio signal.

In order to achieve the above object, a digital watermark detection apparatus according to the second aspect of the present invention comprises echo signal inverse spread means for despreading the echo signals contained in the input watermarked audio signal on the time axis, and digital watermark information extraction means for extracting the digital watermark information from a generation time of the despread echo signals contained in the watermarked audio signal.

The third aspect of the present invention is applied to a digital watermark system, which comprises a digital watermark embedding apparatus for embedding digital watermark information in an input original audio signal, and outputting a watermarked audio signal, and a digital watermark detection apparatus for detecting, from an input watermarked audio signal, digital watermark information embedded in that watermarked audio signal.

In order to achieve the above object, in a digital watermark system according to the third aspect of the present invention, the digital watermark embedding apparatus inserts an echo signal, which is delayed a time period corresponding to digital watermark information to be embedded with respect to each tone signal that forms the input original audio signal into the original audio signal by spreading the echo signal on a time axis, and outputs a watermarked audio signal, and the digital watermark detection apparatus despreads the input watermarked audio signal on the time axis, and extracts the digital watermark information from a generation time of the despread echo signal.

In the digital watermark embedding apparatus, digital watermark detection apparatus, and digital watermark system with the above arrangements, digital watermark information to be embedded in an original audio signal corresponds to times of echo signals spread on the time axis to neighbor tone signals, which form the original audio signal. Therefore, when the time-spread echo signals are despread on the time axis, since one echo signal appears at a time position corresponding to the digital watermark information, the digital watermark information can be detected.

Individual echo signals spread on the time axis have a small signal level, but one echo signal obtained by despreading these echo signals has a large signal level (power), thus improving the detection precision of the digital watermark information. Hence, since individual echo signals spread on the time axis can be set to have a small signal level, the digital watermark information contained in the watermarked audio signal is never heard as noise by the listener.

Since the digital watermark information is embedded in the original audio signal while being consequently spread on the time axis, a third party cannot easily extract the digital watermark information from the watermarked audio signal.

Furthermore, since echo signals are not spread on the frequency axis, and a high-frequency range which is not used by normal speech never contains echo signals of the digital watermark information, the embedded digital watermark information is never heard as a slight noise.

The fourth aspect of the present invention is applied to a digital watermark embedding apparatus for embedding digital watermark information in an input original audio signal, and outputting a watermarked audio signal.

This digital watermark embedding apparatus comprises an impulse response signal generator arranged to output an impulse response signal, which is delayed a time period corresponding to digital watermark information to be embedded with respect to each tone signal that forms the input original audio signal, a time spread unit arranged to spread the impulse response signal output from the impulse response signal generator on a time axis using a PN sequence having a predetermined period, and a convolution unit arranged to execute a convolution process between the impulse response signals spread on the time axis by the time spread unit, and the original audio signal, and output a convolution process result as a watermarked audio signal.

The fifth aspect of the present invention is applied to a digital watermark detection apparatus for detecting, from an input watermarked audio signal, which contains impulse response signals spread as a PN sequence on the time axis, digital watermark information embedded in that watermarked audio signal.

This digital watermark detection apparatus comprises a cepstrum processing unit arranged to execute a cepstrum process for the input watermarked audio signal, a time despread unit arranged to despread the watermarked audio signal that has undergone the cepstrum process by the cepstrum processing unit on the time axis using the PN sequence, and a decode unit arranged to obtain the digital watermark information from the despread signal output from the time despread unit.

A digital watermark system, which comprises these apparatuses, is a detailed embodiment of the digital watermark system of the above invention, and impulse response signals are used as echo signals. Furthermore, as a scheme for spreading the impulse response signals on the time axis, a PN sequence signal is adopted.

As a scheme for detecting digital watermark information from a watermarked audio signal in which the impulse response signals are spread on the time axis, the input watermarked audio signal undergoes a cepstrum process, and is then despread using a PN sequence signal in place of directly despreading that input signal on the time axis using the PN sequence signal.

Since the cepstrum process can separate the watermarked audio signal expressed in the form of products of tone signals of the original audio signal and the impulse response signals, which have undergone a convolution process, into those expressed in the form of sum, the impulse response signals alone can efficiently undergo an inverse spread process.

As described above, in the digital watermark embedding apparatus, digital watermark detection apparatus, and digital watermark system of the present invention, echo signals corresponding to digital watermark information to be embedded are spread on the time axis, and are inserted in an original audio signal.

Therefore, secrecy of the digital watermark information embedded in the original audio signal can be sufficiently assured, the frequency range of the digital watermark information embedded in the original audio signal can be suppressed, and the digital watermark information can be distributed over a broad range on the time axis. Consequently, a third party cannot easily discriminate the fact that the digital watermark information is embedded, and security for copy protection of the original audio signal can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described hereinafter with reference to the accompanying drawings.

Figure 1:
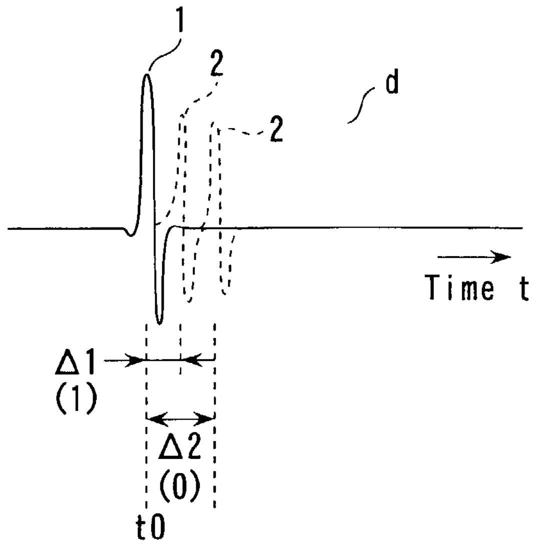
FIG. 1 (PRIOR ART)
FIG. 1 is a signal waveform chart showing the operation principle of a conventional single echo scheme.
Figure 2:
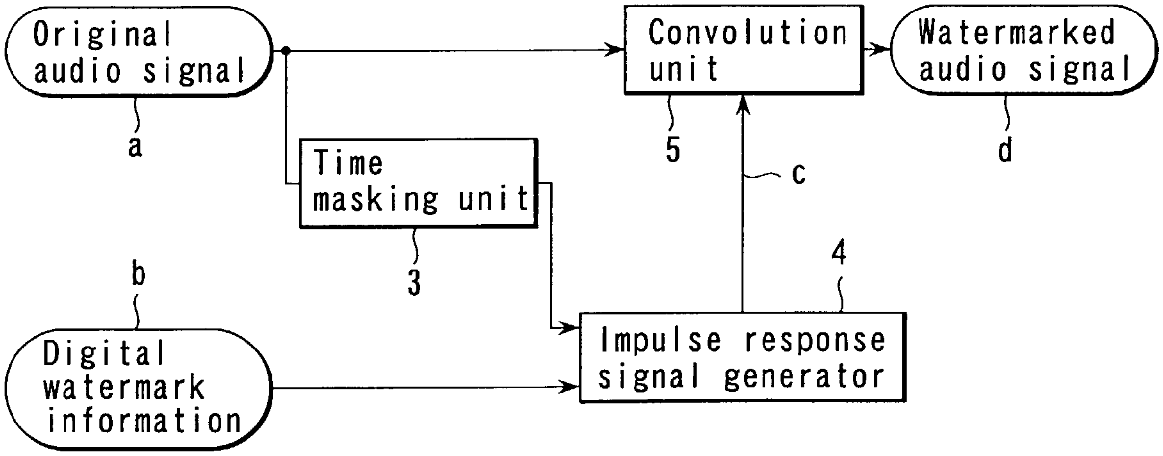
FIG. 2 (PRIOR ART)
FIG. 2 is a schematic block diagram showing the arrangement of a digital watermark embedding apparatus, which adopts the conventional single echo scheme.
Figure 3:
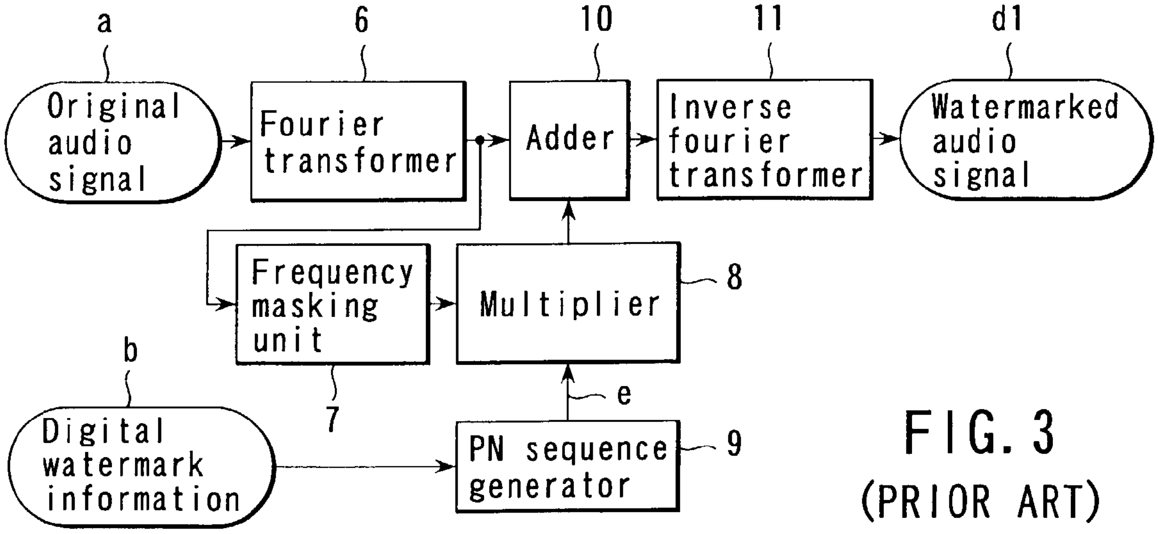
FIG. 3 (PRIOR ART)
FIG. 3 is a schematic block diagram showing the arrangement of a digital watermark embedding apparatus, which adopts a conventional PN sequence scheme.
Figure 4:
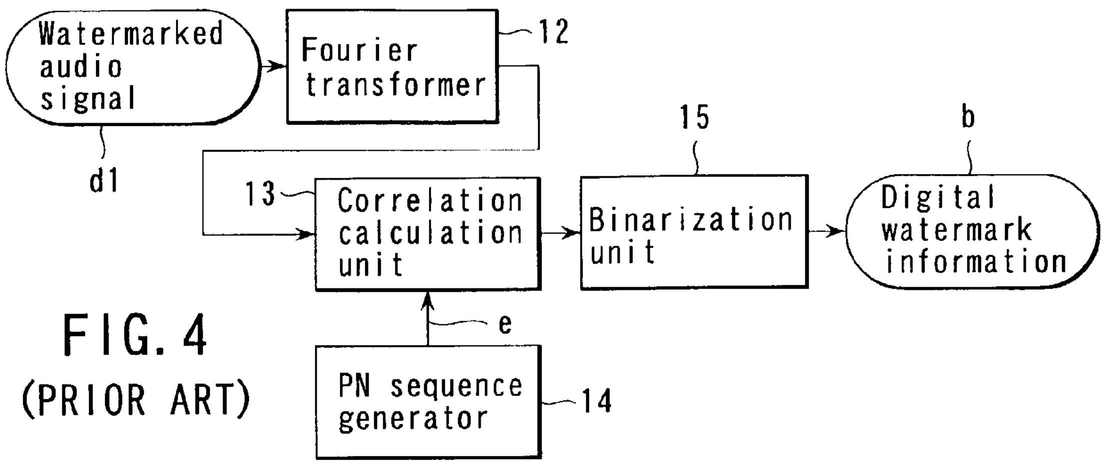
FIG. 4 (PRIOR ART)
FIG. 4 is a schematic block diagram showing the arrangement of a digital watermark detection apparatus, which adopts the conventional PN sequence scheme.
Figure 5:
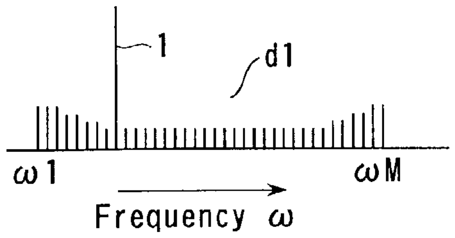
FIG. 5 (PRIOR ART)
FIG. 5 is a signal frequency chart showing the operation principle of the conventional PN sequence scheme.
Figure 6:
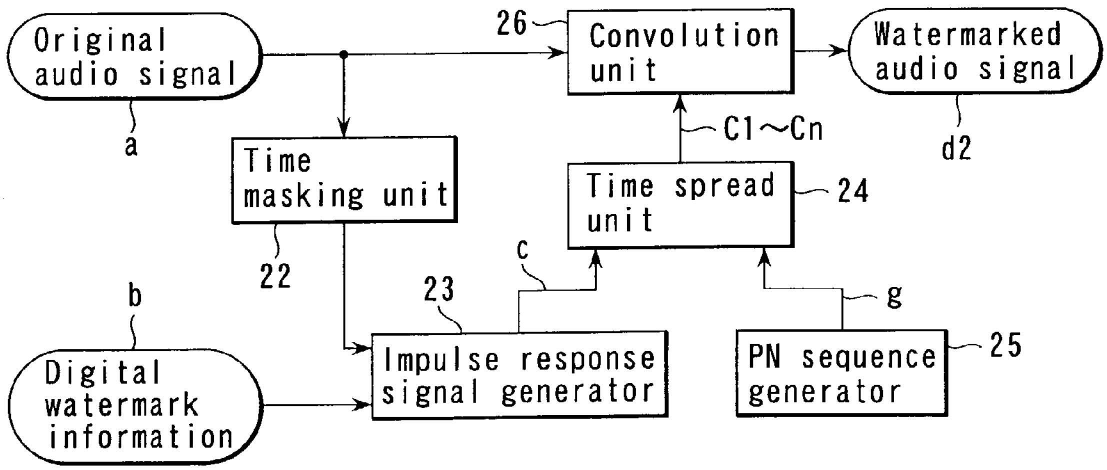
FIG. 6 is a schematic block diagram showing the arrangement of a digital watermark embedding apparatus, which is included in a digital watermark system according to an embodiment of the present invention.
Figure 9:
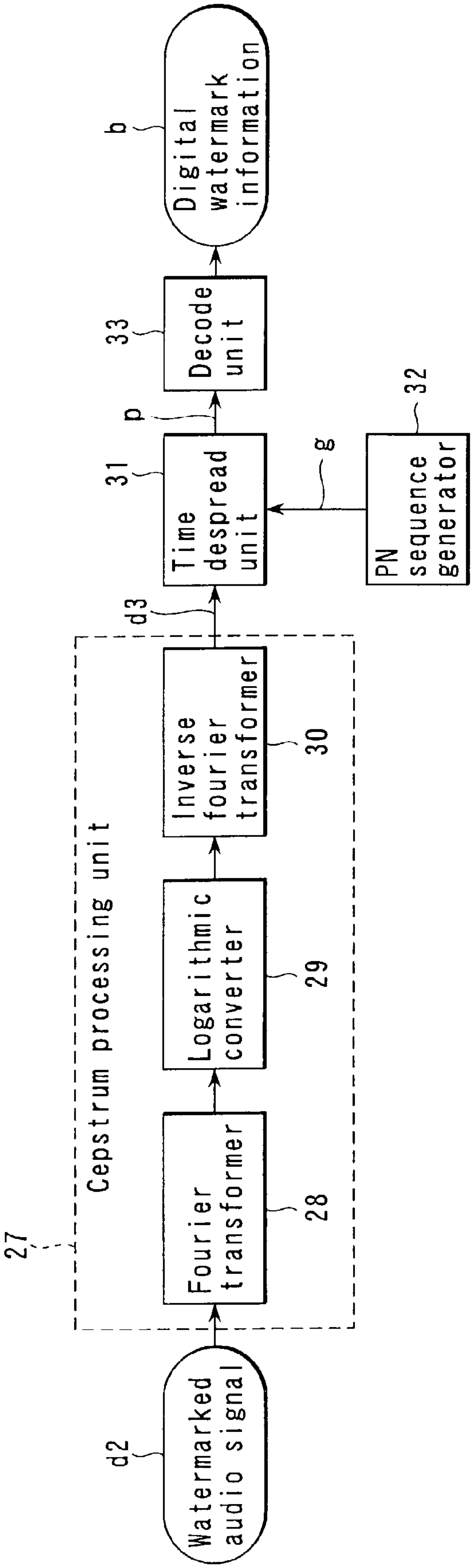
FIG. 9 is a schematic block diagram showing the arrangement of a digital watermark detection apparatus included in the digital watermark system according to the embodiment of the present invention.

FIG. 6 is a schematic block diagram showing the arrangement of a digital watermark embedding apparatus which forms a digital watermark system according to an embodiment of the present invention, and FIG. 9 is a schematic block diagram showing the arrangement of a digital watermark detection apparatus which forms that digital watermark system. The same reference numerals denote the same parts as those in the conventional digital watermark system shown in FIGS. 2 to 4, and a detailed description thereof will be omitted.

Note that the digital watermark embedding apparatus and digital watermark detection apparatus which form the digital watermark system of this embodiment are implemented by software in an information processing apparatus comprising, e.g., a computer and the like.

Figure 7:
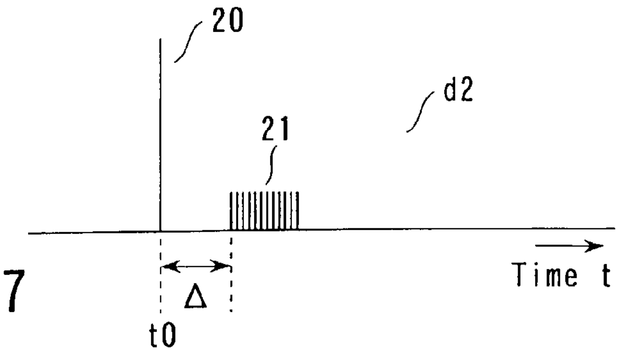
FIG. 7 is an impulse response to be convolved with an original audio signal to make a watermarked audio signal output from the digital watermark embedding apparatus.

The digital watermark embedding apparatus shown in FIG. 6 outputs a watermarked audio signal $d_2$ in which a plurality of impulse response signals 21 as a plurality of echo signals, which start from a time delayed a time period (delay time period) Δ from a generation time $t_0$ of each tone signal 20 that forms an original audio signal a, and are spread in the time axis direction, are embedded in the original audio signal a, as shown in FIG. 7. Note that the time period (delay time period) Δ corresponds to [1] or [0] of digital watermark information b to be embedded.

More specifically, as shown in the digital watermark embedding apparatus in FIG. 6, a time masking unit 22 detects an output time $t_0$ of each tone signal 20 contained in the input original audio signal a. The detected output time $t_0$ is output to an impulse response signal generator 23. The impulse response signal generator outputs an impulse response signal c as an echo signal at a time delayed the time period Δ corresponding to [1] or [0] of the digital watermark information b from the detected output time $t_0$ to a time spread unit 24. A PN sequence generator 25 outputs a PN sequence signal g having a predetermined time (bit) period ($2^m-1$, m; a positive integer) to the time spread unit 24.

The time spread unit 24 spreads the input impulse response signal c, which has been delayed the time period Δ from the output time $t_0$, and is received from the impulse response generator 23, on the time axis using the PN sequence signal g, and outputs the spread signals as a plurality of (=N) new impulse response signals $c_1$ to $c_N$ to a convolution unit 26.

The convolution unit 26 executes a convolution process of the externally input original audio signal a and the impulse response signals $c_1$ to $c_N$ spread on the time axis, and externally outputs the signal that has undergone the convolution process as a watermarked audio signal $d_2$.

When the original audio signal a is a signal which continues for a given period of time, such as music or the like, if the impulse response signal c which serves as an echo signal 2, and approximates the entire original audio signal a to a state delayed by the time period Δ corresponding to [1] or [0] of the digital watermark information b, is continuously output, the time masking unit 22 is not always required.

Figure 8:
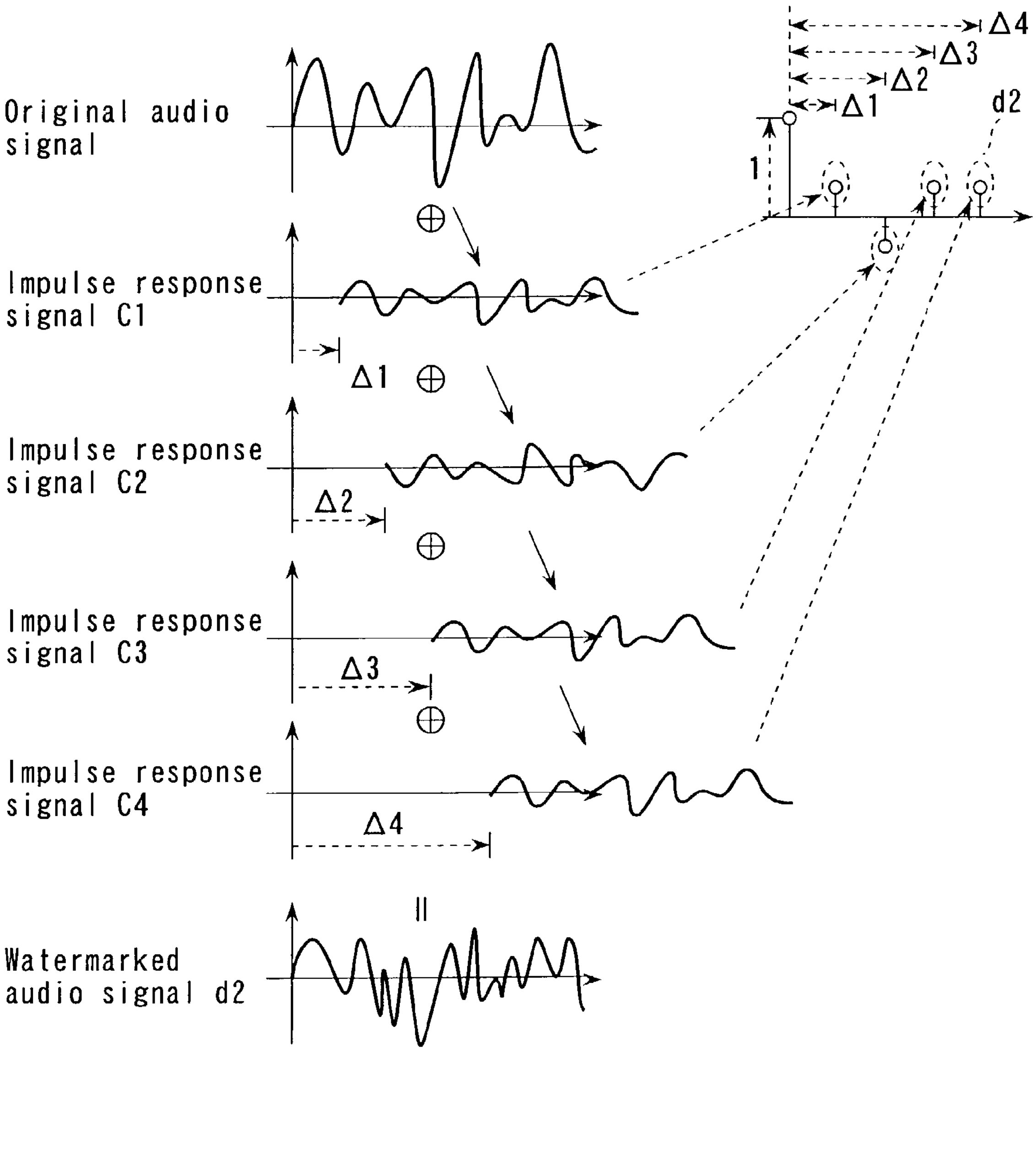
FIG. 8 is a signal waveform chart showing a convolution operation executed by the digital watermark embedding apparatus.

FIG. 8 is a waveform chart for explaining the processing sequence for obtaining the watermarked audio signal $d_2$ by executing the convolution process of the original audio signal a and impulse response signals $c_1$ to $c_N$ in the convolution unit 26. Referring to FIG. 8, impulse response signals $c_1$ to $c_4$, which are respectively time-spread from Δ1 to Δ4, undergo signal synthesis (convolution process) with the original audio signal a, and are respectively embedded in one watermarked audio signal $d_2$.

The relationship between the original audio signal a and watermarked audio signal $d_2$ in this digital watermark embedding apparatus will be explained below using formulas.

Using a delta function (impulse response function), an impulse response signal c is given by:

$$h(n)=\delta(0)+\alpha\delta(\tau) \quad (1)$$

where n; the number of sample indicating the time elapsed, $0<\alpha<1$,

τ; the delay amount, and $\alpha\delta(\tau)$; components of high orders (echo components)

Convolution of the PN sequence signal g (=P(n)) to components of high orders (echo components) alone of the impulse response signal c upon lowering the level yields impulse response signals $c_1$, $c_2$, $C_3$, . . . given by:

$$h(n)=\delta(0)+\alpha\beta P(n-\tau) \quad (2)$$

$0<\beta<<1$

Convolution of the original audio signal a (=f(n)) to the impulse response signals $c_1$, $c_2$, $c_3$, (=h(n)), which have been spread on the time axis, yields a watermarked audio signal $d_2$ (=j(n)) given by:

$$j(n)=f(n)*h(n) \quad (3)$$

A digital watermark detection apparatus shown in FIG. 9 will be explained below.

This digital watermark detection apparatus despreads the input watermarked audio signal $d_2$ on the time axis, and extracts digital watermark information b contained in the watermarked audio signal $d_2$ from the generation time of the despread impulse response signal as an echo signal.

More specifically, as shown in the digital watermark detection apparatus in FIG. 9, an input watermarked audio signal $d_2$ embedded with digital watermark information b is input to a Fourier transformer 28 in a cepstrum processing unit 27. The Fourier transformer 28 Fourier-transforms the input watermarked audio signal $d_2$, and outputs the transformed signal to a logarithmic converter 29. The logarithmic converter 29 logarithmically converts the Fourier-transformed watermarked audio signal $d_2$, and outputs the converted signal to an inverse Fourier transformer 30.

The inverse Fourier transformer 30 inversely Fourier-transforms the watermarked audio signal $d_2$, which has undergone the Fourier transformation and logarithmic conversion, to restore it to a watermarked audio signal $d_3$ of the time axis domain, and outputs that signal to a time despread unit 31 outside the cepstrum processing unit 27.

The time despread unit 31 receives an identical PN sequence signal g from a PN sequence generator 32, which has the same arrangement as the PN sequence generator 25 in the digital watermark embedding apparatus shown in FIG. 6. The time despread unit 31 despreads the watermarked audio signal $d_3$ output from the cepstrum processing unit 27 on the time axis using the PN sequence signal g. More specifically, the unit 31 computes correlation between the watermarked audio signal $d_3$ and PN sequence signal g, and outputs a correlation signal p as an inverse spread signal to a decode unit 33.

Since this time despread unit 31 despreads impulse response signals, which have been spread on the time axis using the PN sequence signal g, on the time axis using the same PN sequence signal g, a large peak waveform appears in the correlation signal p at the correlated time position. That is, this peak waveform position corresponds to the time period (delay time period) Δ corresponding to [1] or [0] of the digital watermark information b with respect to the generation time $t_0$ of each tone signal 20, which forms the original audio signal a. Therefore, the decode unit 33 detects this time period (delay time period) Δ, converts this time period (delay time period) Δ into corresponding digital watermark information b of [1] or [0], and outputs the converted information.

The operations of the cepstrum processing unit 27 and time despread unit 31 in this digital watermark detection apparatus will be explained below using formulas.

The Fourier transformer 28 transforms the watermarked audio signal $d_2$ (=j(n)), which is input to the cepstrum processing unit 27, and is given by:

$$j(n)=f(n)*h(n) \quad (3)$$

into a signal of the frequency domain given by:

$$J(\omega)=F(\omega)\times H(\omega) \quad (4)$$

The logarithmic converter 29 logarithmically converts this Fourier-transformed watermarked audio signal $d_2$ (=J (ω)) which is expressed in the form of product into a signal which is expressed in the form of sum:

$$\log[J(\omega)] = \log[F(\omega)\times H(\omega)] = \log[F(\omega)] + \log[H(\omega)] \quad (5)$$

The inverse Fourier transformer 30 transforms the logarithmically converted watermarked audio signal $d_2$ into a watermarked audio signal $d_3$ of the time domain given by:

$$IDFT\big[\log[F(\omega)] + \log[H(\omega)]\big] = IDFT\big[\log[F(\omega)]\big] + IDFT\big[\log[H(\omega)]\big] \quad (6)$$

When the time despread unit 31 computes the correlation between the watermarked audio signal $d_3$ given by equation (6) and the same PN sequence signal g (=P(n)) as that used in the digital watermark embedding apparatus, an output correlation signal p is expressed in the form of sum of:

the first term of correlation between P(n) and IDFT[log [F(ω)]], and the second term of correlation between P(n) and IDFT [log[H(ω)]].

Since the PN sequence signal g and original audio signal a do not have any correlation, the value of the first term is negligibly small. However, since correlation between elements of the PN sequence signal g and digital watermark information b is very large if the digital watermark information b is embedded, the value of the second term becomes very large. In addition, the time period (time) at which such a large value (peak) is generated is the time period (delay time period) Δ corresponding to [1] or [0] of the digital watermark information b, as described above.

In the digital watermark system with the above arrangement, the digital watermark information b of [1] or [0] to be embedded in the original audio signal a corresponds to generation time periods $\Delta_1$, $\Delta_2$, $\Delta_3$, . . . of impulse response signals $c_1$, $c_2$, $c_3$, . . . , which have been spread on the time axis using the PN sequence signal g to neighbor tone signals 20, which form the original audio signal a.

Therefore, when the time-spread impulse response signals $c_1$, $c_2$, $c_3$, . . . are despread on the time axis using the same PN sequence signal g, since a peak signal (waveform) corresponding to one impulse response signal appears at one time position Δ corresponding to digital watermark information b, the digital watermark information b can be detected.

Since the signal levels of the impulse response signals $c_1$, $c_2$, $c_3$, . . . spread on the time axis can be set to be small, the digital watermark information b contained in the watermarked audio signal $d_2$ is never heard as noise.

Since the digital watermark information b is consequently embedded in the original audio signal a while being spread on the time axis using the PN sequence, a third party cannot easily extract the digital watermark information b from the watermarked audio signal $d_2$ since he or she has no way of finding the PN sequence used in embedding.

Therefore, when the original audio data as the source of pirate copies of a copyrighted work is recognized based on digital watermark information b appended to these pirate copies of the copyrighted work such as music, speech, or the like distributed via various digital media including CDs, DVDs, and the like, the distribution route, etc. of such pirate copies can be known, thus can be used to curb such activities.

Furthermore, since the impulse response signals are not spread on the frequency axis, the embedded digital watermark information b is never heard as a slight noise in the high- and low-frequency ranges.

As the scheme for detecting the digital watermark information b from the watermarked audio signal $d_2$, the input watermarked audio signal $d_2$ undergoes the cepstrum process, and then the inverse spread process. Therefore, the impulse response signals alone can efficiently undergo the inverse spread process (correlation operation process), and the detection efficiency of the digital watermark information b in the digital watermark detection apparatus can be consequently improved.

Note that the present invention is not limited to the aforementioned embodiment. In the embodiment, a PN sequence is used as the scheme for spreading an echo signal (impulse response signal) on the time axis. However, the present invention is not limited to the PN sequence.

For example, a code sequence similar to the PN sequence may be used in place of a perfect PN sequence. In consideration of human auditory characteristics, a signal such as TSP (Time Stretched pulse) or the like used in, e.g., measurement of a head transfer function is preferably used, since digital watermark information is hardly perceived.

Furthermore, the digital watermark information can be embedded using various other methods such as a combination of echo signals, a combination pattern size, and the like in place of the method using the delay amount of an echo signal (impulse response signal).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark embedding apparatus for embedding digital watermark information in an input original audio signal, and outputting a watermarked audio signal, comprising: means for generating an echo signal with respect to the input original audio signal; and means for outputting a watermarked audio signal which includes the input original audio signal and the generated echo signal, wherein the generated echo signal is delayed on a time axis from the input original audio signal by a time period, the time period is a function of said digital watermark.

2. A digital watermark detection apparatus for detecting, from an input watermarked audio signal that contains echo signals spread on a time axis, digital watermark information embedded in that watermarked audio signal, comprising: means for detecting one of said echo signals contained in the input watermarked audio signal; and means for extracting the digital watermark information contained in the watermarked audio signal, wherein said digital watermark information is corresponds to a delay on the time axis between the echo signal and the input original audio signal, and the time period is a function of said digital watermark.

3. A digital watermark embedding apparatus for embedding digital watermark information in an input original audio signal, and outputting a watermarked audio signal, comprising: an impulse response signal generator arranged to output an impulse response signal, respect to each tone signal that forms the input original audio signal; a time spread unit arranged to spread the impulse response signal output from said impulse response signal generator on a time axis using a PN sequence having a predetermined period; and a convolution unit arranged to execute a convolution process between the impulse response signals spread on the time axis by said time spread unit, and the original audio signal, and output a convolution process result as a watermarked audio signal having an echo signal which is delayed a time period, the time period is a function of said digital watermark.

4. A digital watermark detection apparatus for detecting, from an input watermarked audio signal that contains impulse response signals spread on a time axis using a PN sequence, digital watermark information embedded in that watermarked audio signal, comprising:

a cepstrum processing unit arranged to execute a cepstrum process for the input watermarked audio signal;

a time despread unit arranged to despread the watermarked audio signal that has undergone the cepstrum process by said cepstrum processing unit on the time axis using the PN sequence; and a decode unit arranged to obtain the digital watermark information from the despread signal output from said time despread unit based on a time delay between an original signal and a corresponding echo signal.

5. A digital watermark system, comprising:

a digital watermark embedding apparatus for embedding digital watermark information in an input original audio signal and outputting a watermarked audio signal, and a digital watermark detection apparatus for detecting, from an input watermarked audio signal, digital watermark information embedded in that watermarked audio signal, wherein said digital watermark embedding apparatus inserts an echo signal, which is delayed a time period, corresponding to digital watermark information, with respect to each tone signal that forms the input original audio signal into the original audio signal by spreading the echo signal on a time axis, and outputs a watermarked audio signal, and said digital watermark detection apparatus despreads the input watermarked audio signal on the time axis, and extracts the digital watermark information from a generation time of the despread echo signal.

6. A digital watermark system comprising a digital watermark embedding apparatus for embedding digital watermark information in an input original audio signal and outputting a watermarked audio signal, and a digital watermark detection apparatus for detecting, from an input watermarked audio signal, digital watermark information embedded in that watermarked audio signal, wherein said digital watermark embedding apparatus comprises:

an impulse response signal generator arranged to output an impulse response signal, which is delayed a time period corresponding to digital watermark information with respect to each tone signal that forms the input original audio signal;

a time spread unit arranged to spread the impulse response signal output from said impulse response signal generator on a time axis using a PN sequence having a predetermined period; and a convolution unit arranged to execute a convolution process between the impulse response signals spread on the time axis by said time spread unit, and the original audio signal, and output a convolution process result as a watermarked audio signal, and said digital watermark detection apparatus comprises:

a cepstrum processing unit arranged to execute a cepstrum process for the input watermarked audio signal;

a time despread unit arranged to despread the watermarked audio signal that has undergone the cepstrum process by said cepstrum processing unit on the time axis using the PN sequence; and a decode unit arranged to obtain the digital watermark information from the despread signal output from said time despread unit.

7. A digital watermark embedding method for embedding digital watermark information in an input original audio signal, and outputting a watermarked audio signal, comprising:

generating an echo signal, with respect to each tone signal that forms the input original audio signal; and outputting a watermarked audio signal which includes the input original audio signal and inserting the generated echo signal, wherein the generated echo signal is delayed on a time axis from the input original audio signal by a time period corresponding to said digital watermark information. and the time period is a function of said digital watermark.

8. A digital watermark detection method for detecting, from an input watermarked audio signal that contains echo signals spread on a time axis, digital watermark information embedded in that watermarked audio signal, comprising:

detecting one of said echo signals contained in the input watermarked audio signal; and extracting the digital watermark information contained in the watermarked audio signal, wherein said digital watermark information is corresponding to a delay on the time axis between the echo signal and the input original audio signal.

* * * * *